(No Model.)
J. KLEIN.
MARINE VELOCIPEDE.
No. 535,623. Patented Mar. 12, 1895.
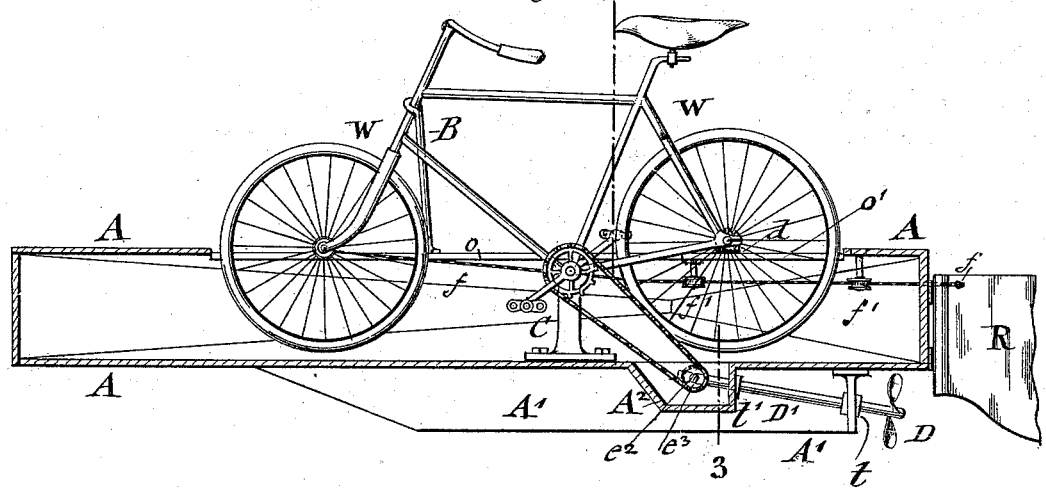
Fig: 1.
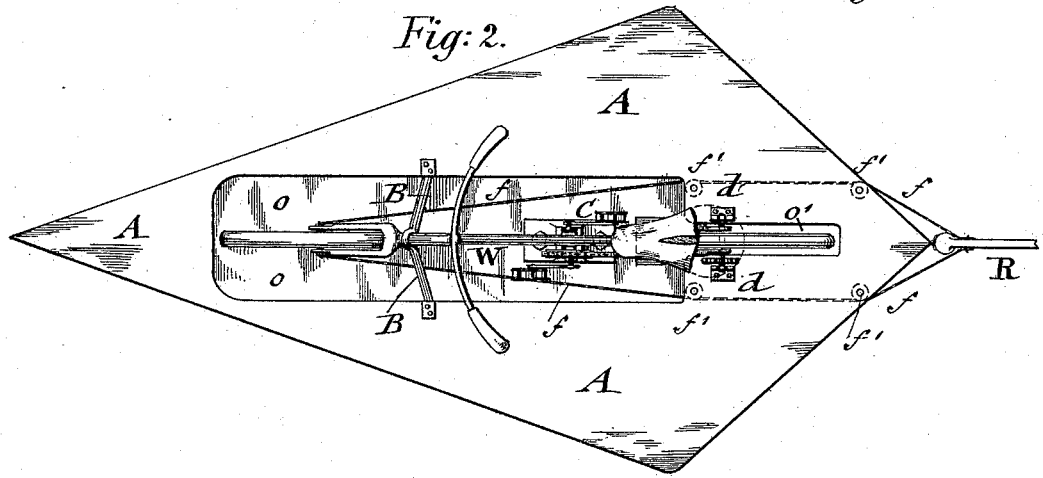
Fig: 2.
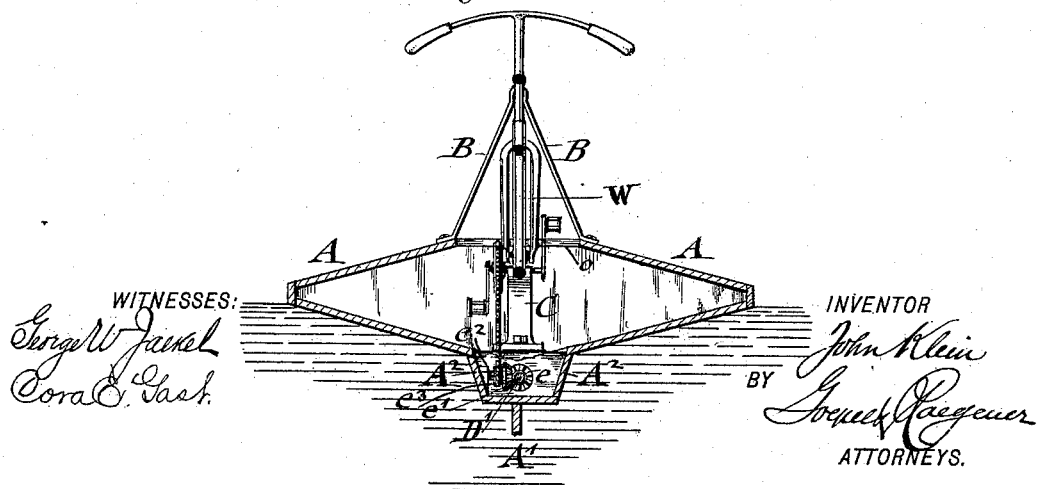
Fig: 3.

UNITED STATES PATENT OFFICE.

JOHN KLEIN, OF BROOKLYN, NEW YORK.

MARINE VELOCIPEDE.

SPECIFICATION forming part of Letters Patent No. 535,623, dated March 12, 1895.

Application filed November 6, 1894. Serial No. 528,030. (No model.)

*To all whom it may concern:*

Be it known that I, JOHN KLEIN, a citizen of the United States, residing in the city of Brooklyn, in the county of Kings and State of New York, have invented certain new and useful Improvements in Marine Velocipedes, of which the following is a specification.

This invention relates to an improved marine-velocipede of that class in which an ordinary bicycle is used in connection with a boat for the purpose of propelling the same, the bicycle being transferred to the boat and its power-transmitting sprocket-chain removed from the sprocket-wheel of the hind-wheel and applied to a similar sprocket-wheel arranged in the hull of the boat, from which the power is transmitted by suitable bevel-wheels to the propeller-shaft; and the invention consists of a boat provided with a propeller and propeller-shaft and with means for supporting the frame and crank-shaft of a bicycle in position in the boat, and means for transmitting power from the crank-shaft of the bicycle to the propeller-shaft of the boat, as will be fully described hereinafter and finally pointed out in the claims.

In the accompanying drawings, Figure 1 represents a side-elevation of my improved marine-velocipede, being partly in vertical longitudinal section through the boat. Fig. 2 is a plan-view of the same, and Fig. 3 is a vertical transverse section, on line 3, 3, Fig. 1.

Similar letters of reference indicate corresponding parts.

Referring to the drawings, A represents a boat of any suitable construction, which is so arranged that a bicycle of the type known as "safety-bicycles" can be applied to the same and used for propelling the boat. For this pose, the boat A is provided with a yoke-shaped standard B which is attached to the forward part of the hull, shorter standard C having a grooved upper end, in which the crank-shaft of the bicycle is supported and seats $d$ $d$ for the rear-part of the frame of the bicycle. For sporting purposes a boat of the shape shown in the drawings is employed, in which the hull is made widest at its rear-part and tapering toward the bow and stern, the bottom of the boat being flat and provided with a stationary center-board $A'$, so that the boat is prevented from tilting over to either side. The bottom, as well as the top of the hull, is provided with a certain inclination, the top being provided with an elongated opening $o$ for inserting the bicycle W, so that the fork of the front-wheel is seated in the bend $b$ at the apex of the yoke B, while the rear-fork rests in the seats $d$ $d$ on the rear-part of the hull, the hind-wheel extending into a slotted extension $o'$ of the return-opening $o$, as shown in Fig. 2. The shafts $D'$ of the propeller D is supported in a bearing $t$ attached to the bottom of the hull, and in a thrust-bearing $t'$ located in the rear-wall of a small box-shaped extension $A^2$ in the bottom of the hull. The propeller-shaft extends to the inside of said box-shaped extension $A^2$ and is provided at its inner end with a bevel-wheel $e$, which meshes with a second bevel-wheel $e'$ that is applied to a short shaft $e^2$, which turns in a bearing on the side wall of the box-shaped extension $A^2$, the short shaft being provided with a sprocket-wheel $e^3$ adjacent to the bevel-wheel $e'$, as shown in Fig. 3, to which the sprocket-chain of the bicycle is applied whenever the same is to be used for propelling the boat. In this case, the sprocket-chain is detached from the sprocket-wheel of the hind-wheel of the bicycle by removing one of the pins connecting two links of the sprocket-chain and applied to the sprocket-wheel on the short transmitting shaft $e^2$ in the box-shaped extension $A^2$ the pin being then replaced so as to connect the separated links. The rudder R is connected by cords or chains $ff$ that pass from the same over pulleys $f'$ $f'$ at the under side of the hull to the fork of the front or steering-wheel of the bicycle, so that the rudder is operated by turning the front-fork of the bicycle by means of the handle to either side. The elongated opening in the upper part of the hull has to be large enough to give sufficient play for the front-wheel and produce thereby the proper steering of the boat.

The flat shape of the hull furnishes safety against the capsizing of the boat in operating the same, while its light construction permits of considerable speed.

The condition for a favorable degree of speed is materially improved by supporting the bicycle in the hull of the boat in such a position that the crank-shaft is approximately on a level with the upper part thereof, so that the crank-shaft will lie near the center of gravity of the boat.

The advantages of my marine-velocipede are that any wheelman can, when arriving at the boat, readily apply his wheel to the hull and then continue his trip on the water, all that is required being to place the bicycle in position on its supports in the boat, transfer the sprocket-chain from the sprocket-wheel of the hind-wheel of the bicycle and to the sprocket-wheel on the short shaft in the bottom of the boat, and make the connection of the steering chains or cords with the front-fork of the bicycle. The boat can then be propelled and steered in the same manner as an ordinary bicycle, so that the latter can not only be used for propulsion on land, but also for quick propulsion on the water, whereby the pleasure of cycling is considerably enhanced.

Having thus described my invention, I claim as new and desire to secure by Letters Patent—

1. The combination, with a boat, provided with a propeller and propelling-shaft, of a safety-bicycle, means for supporting the bicycle in the hull of the boat with its crank-shaft approximately on a level with the upper part thereof, so that the crank-shaft will lie near the center of gravity of the boat, a sprocket-wheel shaft and sprocket-wheel arranged near the end of the propeller-shaft, a bevel-gear transmission between the sprocket-wheel shaft and the propeller-shaft, and the sprocket-chain of the bicycle connected with the sprocket-wheel of the boat, substantially as set forth.

2. The combination, with a boat provided with a propeller and propeller-shaft, of a bicycle, a central standard for supporting the crank-shaft of said bicycle, a front-yoke for supporting the front-part of the frame, a support for the rear-part of the frame, a sprocket-wheel shaft and sprocket-wheel arranged near the inner end of the propeller-shaft, a bevel-gear transmission between the sprocket-wheel shaft and the propeller-shaft, and a sprocket-chain connecting the sprocket-wheel on the crank-shaft of the bicycle with the sprocket-wheel shaft on the boat, substantially as set forth.

In testimony that I claim the foregoing as my invention I have signed my name in presence of two subscribing witnesses.

JOHN KLEIN.

Witnesses;
   PAUL GOEPEL,
   GEORGE W. JAEKEL.